United States Patent
Kaufman

(10) Patent No.: US 9,430,643 B2
(45) Date of Patent: *Aug. 30, 2016

(54) DETECTING MALICIOUS COMPUTER CODE IN AN EXECUTING PROGRAM MODULE

(71) Applicant: International Business Machines Corporation, Armonk, NY (US)

(72) Inventor: Philip D. Kaufman, Omaha, NE (US)

(73) Assignee: International Business Machines Corporation, Armonk, NY (US)

( * ) Notice: Subject to any disclaimer, the term of this patent is extended or adjusted under 35 U.S.C. 154(b) by 228 days.

This patent is subject to a terminal disclaimer.

(21) Appl. No.: 14/062,246

(22) Filed: Oct. 24, 2013

(65) Prior Publication Data

US 2014/0053270 A1  Feb. 20, 2014

Related U.S. Application Data

(63) Continuation of application No. 13/427,089, filed on Mar. 22, 2012, now Pat. No. 8,640,243.

(51) Int. Cl.
*G06F 11/00* (2006.01)
*G06F 21/55* (2013.01)
(Continued)

(52) U.S. Cl.
CPC ............... *G06F 21/55* (2013.01); *G06F 21/51* (2013.01); *G06F 21/54* (2013.01); *G06F 21/552* (2013.01); *G06F 21/566* (2013.01); *G06F 2221/033* (2013.01)

(58) Field of Classification Search
CPC  H04L 63/1416; H04L 63/1408; G06F 21/56
See application file for complete search history.

(56) References Cited

U.S. PATENT DOCUMENTS 7,603,713 B1   10/2009  Belov
7,844,828 B2 *  11/2010  Giraud ................... G06F 21/75
                                              713/187

(Continued)

FOREIGN PATENT DOCUMENTS

CN          101021886 A      8/2007
CN          103324889 A      9/2013
(Continued)

OTHER PUBLICATIONS

"Are you worried About z/OS System Security? If Not, You Should Be". VAT Security, Home Page, Ensuring Systems Integrity for z/Series, [online] Accessed on Feb. 1, 2012. Copyright 2010-2012, Key Resources, Inc. <URL: http://www.vatsecurity.com/>.

(Continued)

*Primary Examiner* — Ali Abyaneh
(74) *Attorney, Agent, or Firm* — David Zwick; Matthew Chung

(57) ABSTRACT

A computer program includes a plurality of different types of computer program instructions. Prior to execution of the computer program, the computer the computer program instructions of each of the types. At a time during execution of the computer program, the computer counts the computer program instructions of each of the types. The computer, in response to determining that the count for one of the instruction types determined prior to execution of the computer program differs by at least an associated threshold value from the count for the same instruction type determined during execution, makes a record that the computer program has an indicia of maliciousness.

16 Claims, 4 Drawing Sheets

(51) Int. Cl.
  *G06F 21/51* (2013.01)
  *G06F 21/54* (2013.01)
  *G06F 21/56* (2013.01)

(56) References Cited

U.S. PATENT DOCUMENTS

| | | | |
|---|---|---|---|
| 8,020,207 | B2 | 9/2011 | Chow et al. |
| 8,640,243 | B2 | 1/2014 | Kaufman |
| 2002/0013691 | A1* | 1/2002 | Warnes ............... G06F 9/30145 703/22 |
| 2007/0192620 | A1 | 8/2007 | Challener et al. |
| 2008/0126742 | A1 | 5/2008 | Shupak et al. |
| 2010/0310068 | A1* | 12/2010 | Fischer ............... H04N 7/1675 380/43 |
| 2012/0266244 | A1 | 10/2012 | Green et al. |
| 2013/0239215 | A1 | 9/2013 | Kaufman |

FOREIGN PATENT DOCUMENTS

| | | |
|---|---|---|
| EP | 2284750 A1 | 2/2011 |
| GB | 2502660 A | 4/2013 |
| WO | 2007121361 A2 | 10/2007 |
| WO | 2007121361 A3 | 10/2007 |
| WO | 2009014779 A2 | 1/2009 |
| WO | 2011084614 A2 | 7/2011 |

OTHER PUBLICATIONS

"z/OS Vulnerability Analysis Tool (VAT) User's Guide Ensuring Systems Integrity for z/Series" [online] Accessed on: Jan. 31, 2012. Copyright Key Resources, Inc. 2010. URL: www.vatsecurity.com/uploads/zVAT_user_Primer.pdf.

Office Action, U.S. Appl. No. 13/427,089, May 9, 2013.

Response to Office Action, U.S. Appl. No. 13/427,089, Jul. 23, 2013.

Notice of Allowance, U.S. Appl. No. 13/427,089, Sep. 30, 2013.

Kaufman, "Detecting Malicious Computer Code in an Executing Program Module," Pending Application No. 102013203854.2, filed on Mar. 7, 2013, pp. 1-28.

* cited by examiner

DETECTING MALICIOUS COMPUTER CODE IN AN EXECUTING PROGRAM MODULE

CROSS-REFERENCE TO RELATED APPLICATIONS

This application is a continuation of U.S. patent application Ser. No. 13/427,089, filed Mar. 22, 2012, the entire disclosure of which is incorporated herein by reference.

FIELD OF THE INVENTION

The present invention relates generally to detecting a malicious computer program, and more particularly to detecting malicious program instructions that are hidden in the program.

BACKGROUND

Many computer viruses and other malware can be detected by scanning for a signature pattern of bits associated with the malware. Among the ways viruses and other types of malware are designed to escape detection by virus scanner software is to obfuscate or scramble their malicious code into an unrecognizable format within a stored executable program module. Then, as the program is actively executing, the scrambled code is unscrambled by itself into executable code so that the CPU can execute the code. For example, different parts of a sequence of malicious instructions can be scattered and fragmented in the program in an inoperable and unrecognizable form prior to execution, and repositioned and combined during execution so they become operable. This technique is referred to as virus obfuscation. The obfuscated virus can be designed so that it may take several executions of the program module before the malicious code is fully assembled and ready for execution. An object of the present invention is to detect obfuscated malware.

SUMMARY

Embodiments of the present invention provide a system, method, and program product to determine if a computer program in a memory of a computer is malicious. The computer program includes a plurality of different types of computer program instructions, each computer program instruction being of one or more instruction types. Prior to execution of the computer program instructions, the computer counting the computer program instructions of each of the types. At a time during execution of the computer program, the computer counting the computer program instructions of each of the types. The computer determining that the count of the computer program instructions of one of the instruction types determined prior to execution of the computer program differs by at least an associated threshold value from the count of the computer program instructions of the one type determined at the time during execution of the computer program, and in response, making a record that the computer program has an indicia of maliciousness.

Another embodiment provides that the computer determines that the count of the computer program instructions of another of the types determined prior to execution of the computer program differs by at least an associated threshold value from the count of the computer program instructions of the other type determined at the time during execution of the computer program, and making the record that the computer program has an indicia of maliciousness is based on both differences.

In another embodiment, the step of determining during execution is performed at two or more times during execution of the computer program instructions.

In yet another embodiment, the step of determining during execution is performed by a program routine that is called upon the execution of a computer program instruction of the type operating system interrupt generating program instruction. In certain embodiments, a program instruction of the type operating system interrupt generating program instruction is inserted into the computer program.

In other embodiments, the associated threshold value is zero, or the associated threshold value is an integer greater than zero.

In yet another embodiment, the computer, in response to determining that the count for one of the instruction types determined prior to execution differs an associated threshold value from the count for the one instruction type determined during execution, terminates or suspends execution of the program.

DETAILED DESCRIPTION

Embodiments of the present invention will now be described in detail with reference to the accompanying drawings.

Figure 1:
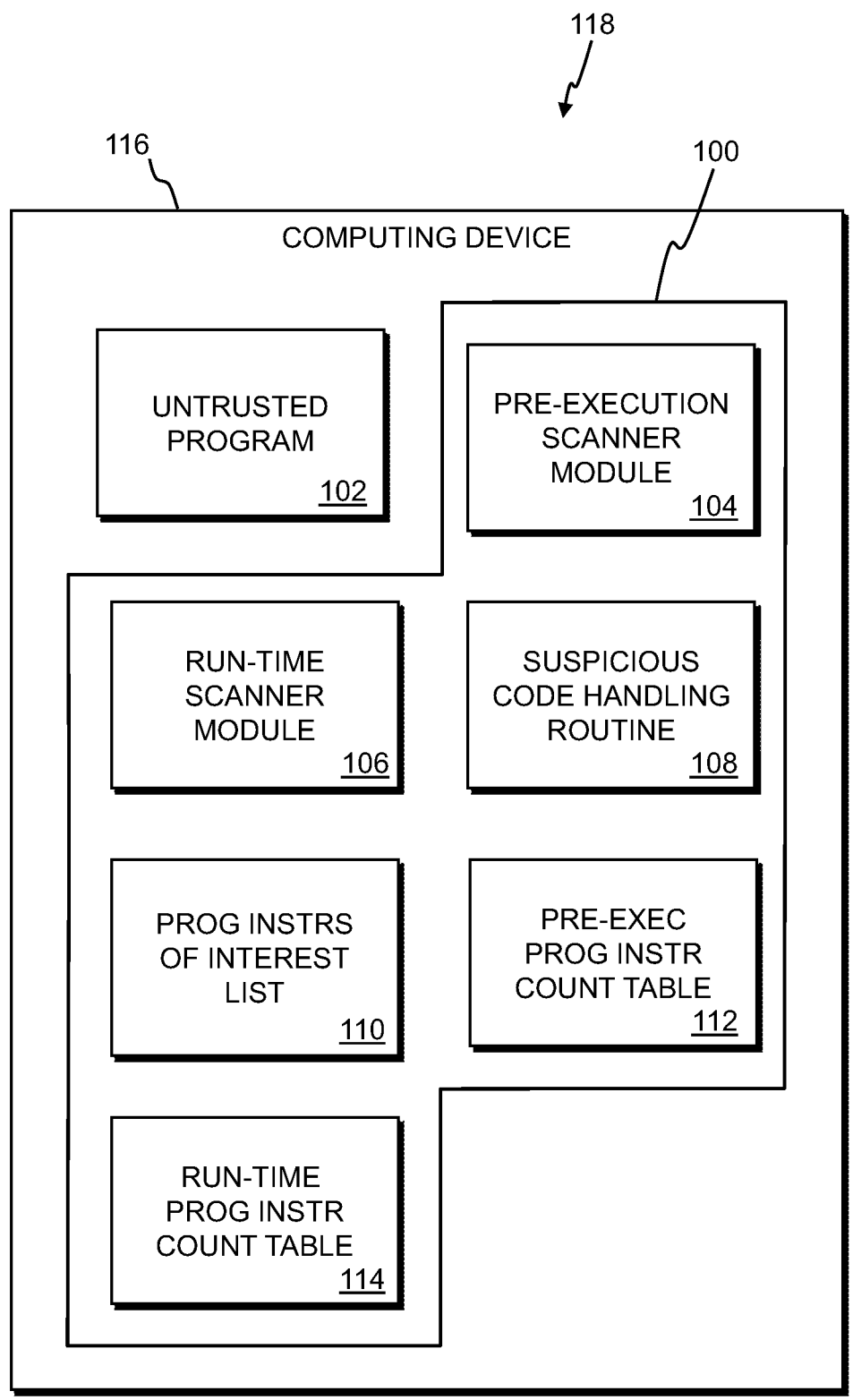
FIG. 1 is a functional block diagram of a malware detection system in accordance with an embodiment of the present invention.

FIG. 1 is a functional block diagram of a malware detection system 118 including a computing device 116 and a malware detection program 100. The malware detection program 100 operates on untrusted program 102 in accordance with a preferred embodiment of the present invention to determine if untrusted program 102 contains malware. In the preferred embodiment, malware detection program 100 includes pre-execution scanner module 104, run-time scanner module 106, suspicious code handling routine 108, program instructions of interest list 110, pre-execution program instruction count table 112, and run-time program instruction count table 114, all installed and executing in computing device 116.

In preferred embodiments of the invention, computing device 116 can be a mainframe or mini computer, a laptop, tablet, or netbook personal computer (PC), or a desktop computer. In general, computing device 116 can be any programmable electronic device that has operating system functions capable of receiving and servicing interrupt requests from an actively running untrusted program 102, a loader function to load a untrusted program 102, and sufficient volatile memory to handle the software requirements of storing and running pre-execution scanner module 104, run-time scanner module 106, and suspicious code handling routine 108, all as described in further detail below.

Typically, untrusted program 102 is an application program. Untrusted program 102 may be downloaded from a server via a network and is loaded for execution into computer memory, for example, RAM 822, from permanent storage, for example, tangible storage device 830, by the load process of, for example, operating system 828, of computing device 116 (see FIG. 8). Untrusted program 102 typically results from having an executable module produced by a language compiler. Untrusted program 102 includes program instructions, typically machine instructions, and is loaded into memory for execution by the load and execute process of, for example, operating system 828. In a preferred embodiment, untrusted program 102 is divided into different segments, such as code segments that contain executable machine instructions, and data segments that contain global and static program variables.

Pre-execution scanner module 104, the operation of which is explained in greater detail below with respect to FIG. 2, operates to populate pre-execution table 112 with counts of predetermined types of program instructions that might be found in the program before execution. Pre-execution table 112, which is created as part of the program load process, contains entries for each of these types of program instructions, commonly referred to as op codes, included in program instructions of interest list 110, which is also explained in greater detail below. When pre-execution scanner module 104 executes, it populates pre-execution table 112 with counts by instruction value of all program instructions in untrusted program 102, prior to execution of any program instructions in the program, that are contained in program instructions of interest list 110. In a preferred embodiment, a load and execute process of operating system 828 invokes pre-execution scanner module 104 when untrusted program 102 is loaded for execution, and before any program instructions in untrusted program 102 have been executed.

Run-time scanner module 106, the operation of which is explained in greater detail below with respect to FIG. 3, operates to populate run-time table 114 with counts of predetermined types of program instructions found in untrusted program 102 at certain times during its execution. Run-time table 114 is created as part of the program load process, and contains entries for each of the types of program instructions of interest as specified in program instructions of interest list 110. Run-time scanner module 106 can execute at multiple times during the execution of untrusted program 102, and during each execution of module 106, populates run-time table 114 with the counts by instruction value of all program instructions in untrusted program 102, counted at the time of execution of run-time scanner module 106, that are contained in program instructions of interest list 110. After run-time scanner module 106 completes a run-time count of instructions in untrusted program 102, run-time scanner module 106 determines if there are significant differences between the pre-execution instruction counts contained in pre-execution table 112, and the run-time instruction counts contained in run-time table 114. Significant increases in run-time instruction counts over the pre-execution instruction counts could indicate that obfuscated malicious code may have been unscrambled into executable code within untrusted program 102.

In a preferred embodiment, operating system 828 calls run-time scanner module 106 at the start of servicing of operating system interrupts generated by interrupt-generating program instructions. For example, the operating system interrupt routine that services interrupt-generating program instructions is modified to first call run-time scanner module 106 before addressing the actual reason the interrupt was generated, such as retrieving data from tangible storage device 830. This is done because the untrusted program 102 tends to be "frozen" during the interrupt handling and presents a stable body of code from which to count program instructions.

In other embodiments of the invention, pre-execution scanner module 104 inserts custom or "dummy" interrupt instructions into untrusted program 102 at regular intervals in the program code so as to cause system interrupts to allow run-time scanner module 106 to perform a scan on untrusted program 102 while it is executing. For example, a custom interrupt instruction can be a customized supervisor call (SVC) instruction on an IBM mainframe that is designed to always complete successfully, but is modified to call run-time scanner module 106 before successful completion. These custom interrupt instructions can be useful in the situation where the program module as written has few, or no, instructions that generate interrupts, or in situations where a high level of scanning is desired. The custom interrupt instructions can, for example, overlay existing instructions in untrusted program 102 at regular address intervals at load time, with the overlaid instructions saved into a save area. After a custom interrupt instruction has executed and run-time scanner module 106 has completed its scan of untrusted program 102, the overlaid program instruction can, for example, be restored to its original location in untrusted program 102, the program location counter in the program status word (PSW) can be rolled back to point to the location of the newly restored instruction, and program execution can resume.

In certain embodiments, operating system 828 calls run-time scanner module 106 as part of the program exit and cleanup process. This has the advantage of obtaining a scan after all program instructions of untrusted program 102 have executed. The same as for scans performed during program execution, if significant increases are found in the end-of-program instruction counts over the pre-execution instruction counts, this could indicate that obfuscated malicious code may been unscrambled into executable code within untrusted program 102.

Run-time scanner module 106 calls suspicious code handling routine 108 when run-time scanner module 106 identifies a significant difference between the pre-execution instruction counts contained in pre-execution table 112, and the run-time instruction counts contained in run-time table 114. In a preferred embodiment, because a significant difference can indicate that new executable instructions have appeared in untrusted program 102 during execution, and that obfuscated malicious code may have been unscrambled within untrusted program 102, a conservative approach is taken and suspicious code handling routine 108 immediately terminates execution of untrusted program 102 in accordance with the process and procedures of the computing system environment. Typically, a warning report or some other indication will also be generated indicating that suspicious code was found. In other embodiments, suspicious code handling routine 108 can, for example, log an entry in a warning report indicating that suspicious code was found, and return to normal execution of the program instructions, or suspend execution of the program instructions. Although suspicious code handling routine 108 is illustrated and described as a separate routine, suspicious code handling routine 108 can also, for example, be implemented as an integrated function within run-time scanner module 106.

In a preferred embodiment, program instructions of interest list 110 includes entries containing the instruction values of system defined machine instructions of interest. When untrusted program 102 is loaded into memory for execution by the load and execute process of operating system 828, program instructions of interest list 110 is also loaded into memory. In a preferred embodiment, the program instructions of interest are defined at a system level, for example, by a system administrator, and at least include program instructions that can directly cause malicious harm in the computing environment. For example, the program instructions of interest typically will include program instructions related to input/output operations, such as those program instructions directed to disk writes. The program instructions of interest can be a subset of all available program instructions, or can be the entire set of available program instructions.

While execution of an interrupt-generating instruction is needed for control to pass to run-time scanner module 106 for instruction count scanning, not every system defined program instruction of interest will necessarily generate a system interrupt. For example, the program instructions of interest may include certain privileged instructions that do not cause a system interrupt, certain non-privileged "sensitive" instructions that can directly result in malicious damage, or all program instructions in untrusted program 102. An example of a sensitive instruction is the MOVE instruction, used by mainframe computers manufactured by International Business Machines Corporation (IBM), which can modify a restricted portion of system memory without creating an interrupt. Program instructions of interest list 110 would include the instruction value of the MOVE instruction, and both pre-execution table 112 and run-time table 114 would contain entries for the instruction value of the MOVE instruction. If a high degree of security is desired, program instructions of interest list 110, and both pre-execution table 112 and run-time table 114, can contain entries for every program instruction available in the computing environment.

Figure 2:
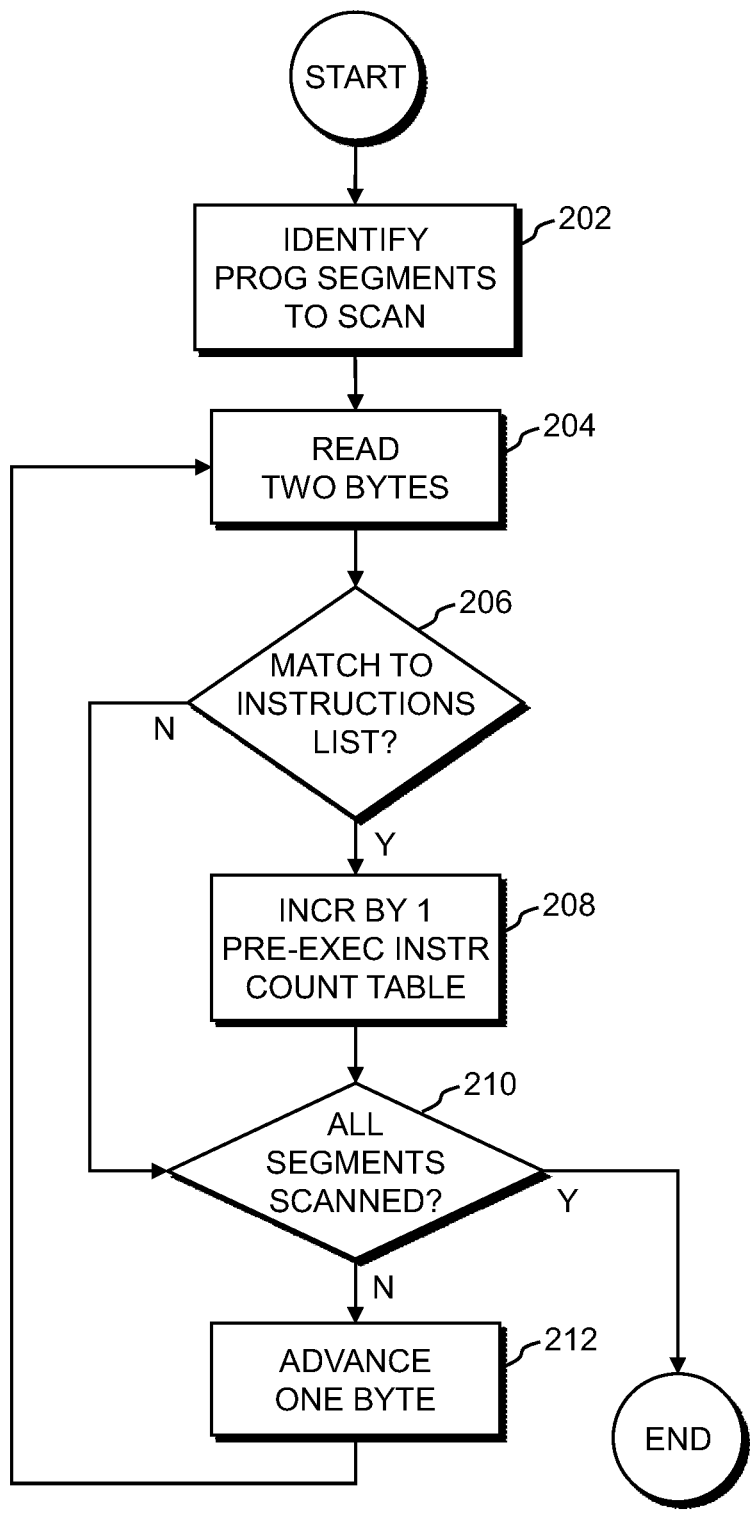
FIG. 2 is a flowchart illustrating the steps of a pre-execution scanner module of FIG. 1 in accordance with an embodiment of the present invention.

FIG. 2 is a flowchart illustrating the steps of pre-execution scanner module 104 of malware detection program 100 in accordance with a preferred embodiment of the present invention. As stated above, operating system 828 calls pre-execution scanner module 104 as part of the load and execute process of operating system 828 after a program has been loaded into memory for execution. In the preferred embodiment, after untrusted program 102 has been loaded into memory 822 of computing device 116, along with program instructions of interest list 110, pre-execution scanner module 104 reads the program header information to identify the locations of the program segments to be scanned in untrusted program 102 (step 202). In a preferred embodiment, pre-execution scanner module 104 scans all code segments and data segments of untrusted program 102, as these typically are the program segments that an executing program is allowed to modify. In other embodiments of the invention, additional segment types may be scanned. In a preferred embodiment, after the program segments to be scanned are identified, pre-execution scanner module 104 sets a scan address pointer to the first byte of the first program module to be scanned, and begins scanning untrusted program 102 two bytes at a time (step 204). In the preferred embodiment, such as an embodiment in which computing device 116 is a mainframe computer, a machine instruction value can be either one or two bytes long. In order to insure that pre-execution scanner module 104 can detect the longest instruction value that might be contained in the scanned bytes, two bytes at a read. In general, any length of bytes can be read, as may be determined by the maximum instruction length for the computing environment in which the embodiment is implemented.

After two bytes of a code or data segment of untrusted program 102 have been read (step 204), pre-execution scanner module 104 compares the two bytes to program instruction values in program instructions of interest list 110 to determine if the first byte or the combined first and second bytes match any one-byte or two-byte program instruction values contained in the entries of program instructions of interest list 110 (decision 206). If there is a match between the first byte or combined first and second byte value to an entry in program instructions of interest list 110, then pre-execution scanner module 104 increments by one the instruction count value of the corresponding program instruction entry in pre-execution table 112 (step 208).

In other embodiments, the entries in program instructions of interest list 110 are not limited to only instruction values. For example, certain entries in list 110 can be instruction values followed by specific instruction operand values. In these embodiments, the number of in list 110.

After pre-execution scanner module 104 has incremented the instruction count value of the corresponding program instruction entry in pre-execution table 112 (step 208), or no match was found between the first byte or the combined first and second byte value and any one-byte or two-byte program instruction values contained in the entries of program instructions of interest list 110 (decision 206), pre-execution scanner module 104 determines if all program segments to be scanned have been scanned (decision 210). If all program segments have not been scanned, then pre-execution scanner module 104 advances the scan address pointer by one byte (step 212) and begins a scan on the two bytes located at the new scan pointer address (step 204). In a preferred embodiment, after the last byte of a program segment has been scanned, the scan address pointer is advanced to the address of the first byte of the next program segment to scan. If pre-execution scanner module 104 determines that all program segments to be scanned have been scanned (decision 210), then pre-execution scanner module 104 ends execution.

Figure 3:
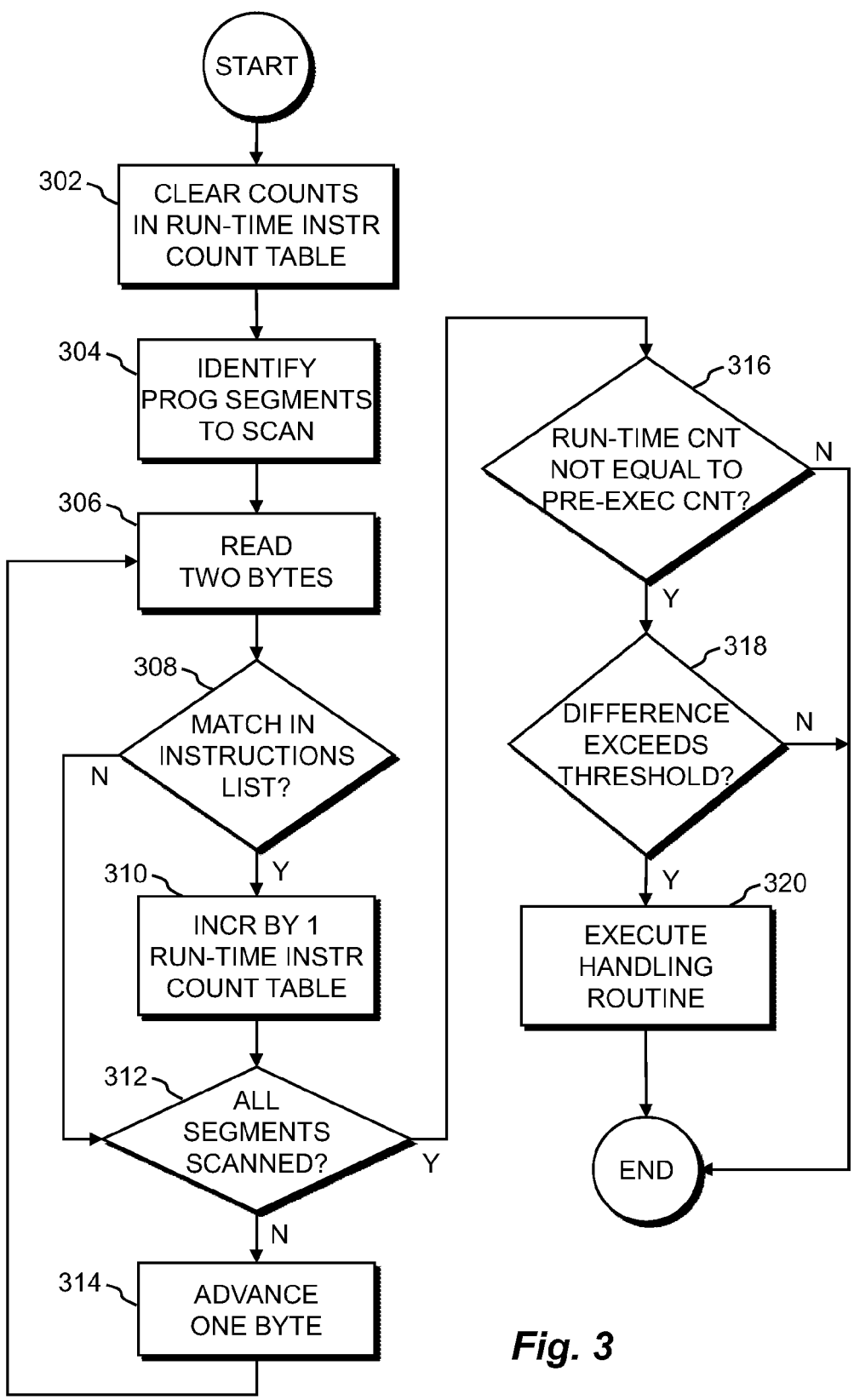
FIG. 3 is a flowchart illustrating the steps of a run-time scanner module of FIG. 1 in accordance with an embodiment of the present invention.

FIG. 3 is a flowchart illustrating the steps of run-time scanner module 106 of FIG. 1 in accordance with an embodiment of the present invention. As stated above, in a preferred embodiment, operating system 828 calls run-time scanner module 106 at the start of servicing of operating system interrupts generated by interrupt-generating program instructions. When called, run-time scanner module 106 first clears all instruction count values in run-time table 114 (step 302). In the same manner as the execution of pre-execution scanner module 104, run-time scanner module 106 then scans certain program segments in untrusted program 102 and determines a count by instruction value, which is stored in run-time table 114.

After the instruction counts have been cleared (step 302), run-time scanner module 106 reads the header information in untrusted program 102 to identify the locations of the program segments to scan in untrusted program 102 (step 304). Run-time scanner module 106 then sets a scan address pointer to the first byte of the first program module to be scanned, and begins scanning untrusted program 102 two bytes at a time (step 306).

After two bytes of a code or data segment of untrusted program 102 have been read (step 306), run-time scanner module 106 compares the two bytes to program instruction values in program instructions of interest list 110 to determine if the first byte or the combined first and second bytes match any one-byte or two-byte program instruction values contained in the entries of program instructions of interest list 110 (decision 308). If there is a match between the first byte or combined first and second byte value to an entry in program instructions of interest list 110, then run-time scanner module 106 increments by one the instruction count value of the corresponding program instruction entry in run-time table 114 (step 310).

After run-time scanner module 106 has incremented the instruction count value of the corresponding program instruction entry in run-time table 114 (step 310), or no match was found between the first byte or the combined first and second byte value and any one-byte or two-byte machine instruction values contained in the entries of program instructions of interest list 110 (decision 308), run-time scanner module 106 determines if all program segments to be scanned have been scanned (decision 312). If all program segments have not been scanned, run-time scanner module 106 advances the scan address pointer by one byte (step 314) and begins a scan on the two bytes located at the new scan pointer address (step 306). In a preferred embodiment, after the last byte of a program segment has been scanned, the scan address pointer is advanced to the address of the first byte of the next program segment to scan.

If run-time scanner module 106 determines that all program segments to be scanned have been scanned (decision 312), then run-time scanner module 106 performs a comparison of the values in run-time table 114 and pre-execution table 112 (decision 316). If there are differences between the pre-execution instruction counts and the run-time instruction counts, then run-time scanner module 106 determines if the differences exceed defined threshold values (decision 318). In a preferred embodiment, threshold values are based on the difference in instruction counts between the run-time instruction counts and the pre-execution instruction counts.

Any increase in the total number of instructions between the pre-execution instruction counts and the run-time instruction counts could indicate that obfuscated malicious code may have been unscrambled into executable code within untrusted program 102. However, there is the possibility that a program address location can be legitimately changed to a value that matches a program instruction value contained in program instructions of interest list 110. For example, locations in data segments of untrusted program 102 may contain program variables that constantly change value as untrusted program 102 is executing. It is possible that at the time that an interrupt-generating program instruction executes and run-time scanner module 106 is called, a location in a program data segment of untrusted program 102 may happen to contain a value that matches a program instruction value contained in program instructions of interest list 110. This is particularly true when comparing a location corresponding to the least significant byte of a program variable, which typically changes more often than the most significant bytes, to a one-byte program instruction value. This is because there are only 256 possible values for a one-byte instruction value, as opposed to over 65,000 possible values for a two-byte instruction value.

A conservative approach is to define a threshold value of zero. For example, the threshold is compared to the difference in count values between the run-time total number of instructions and the pre-execution total instruction count, as determined by pre-execution scanner module 104. If any run-time total instruction count, as determined during any iteration of the execution of run-time scanner module 106, exceeds the pre-execution total instruction count, then the threshold of zero is exceeded (step 318). Suspicious code handling routine 108 is called (step 320), which will, for example, immediately terminate execution of untrusted program 102. This approach may lead to an unacceptable level of false identifications of possible malicious code.

An alternative approach that may lower the level of false identifications of possible malicious code is to set threshold values for total instruction counts by group or class of program instruction type. For example, program instructions in the instruction count tables 112 and 114 can be assigned to different classes, based on the likelihood that the program instruction will be present in malicious code. Instruction classes with higher likelihoods might be assigned lower threshold values above the pre-execution scan counts than instruction classes with lower likelihoods. After run-time scanner module 106 has scanned untrusted program 102, total run-time counts by instruction class are determined. If the run-time total count for an instruction class exceeds the pre-execution total count for the class, the difference is compared to the appropriate threshold value (step 318) and if the threshold value is exceeded, then suspicious code handling routine 108 is called (step 320). Similarly, each instruction can be considered its own instruction type, and threshold values can be set on an instruction by instruction basis, or all instructions can be considered in the same class, and a threshold value for total instruction counts can be set. In other embodiments, each instruction can be of more than one instruction type, and the determination of whether to call suspicious code handling routine 108 can involve logical and arithmetic combinations of whether threshold values by instruction types are exceeded. In still other embodiments, threshold values can be determined based on percentages of instruction counts.

Figure 4:
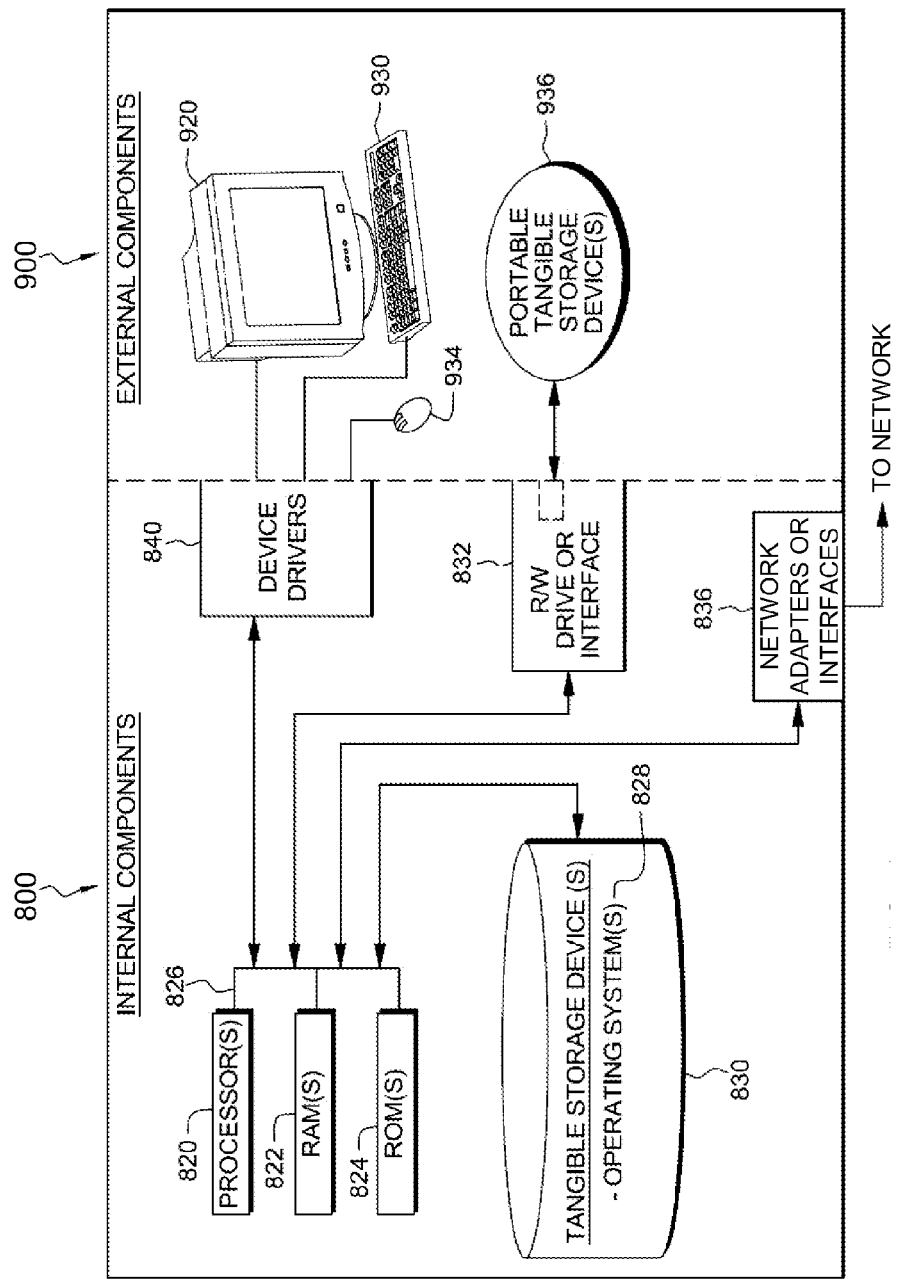
FIG. 4 is a block diagram of hardware and software within the system of FIG. 1.

FIG. 4 shows a block diagram of the components of a data processing system 800, 900, such as computing device 116, in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, mainframe computer systems, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

Computing device 116 includes internal components 800 and external components 900 illustrated in FIG. 4. Internal components 800 includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and programs 100 and 102 in computing device 116 are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information. The terms "computer-readable tangible storage device" and "computer-readable storage device" do not include a signal propagation media such as a copper transmission cable, optical transmission fiber, or wireless transmission media.

Internal components 800 also includes a R/W drive or interface 832 to read from and write to one or more portable computer-readable tangible storage devices 936 such as a CD-ROM, DVD, memory stick, magnetic tape, magnetic disk, optical disk or semiconductor storage device. The programs 100 and 102 in computing device 116 can be stored on one or more of the respective portable computer-readable tangible storage devices 936, read via the respective R/W drive or interface 832 and loaded into the respective hard drive 830.

Internal components 800 also includes network adapters or interfaces 836 such as a TCP/IP adapter cards, wireless wi-fi interface cards, or 3G or 4G wireless interface cards or other wired or wireless communication links. The programs 100 and 102 in computing device 116 can be downloaded to computing device 116 from an external computer via a network (for example, the Internet, a local area network or other, wide area network) and network adapters or interfaces 836. From the network adapters or interfaces 836, the programs 100 and 102 in computing device 116 are loaded into hard drive 830. The network may comprise copper wires, optical fibers, wireless transmission, routers, firewalls, switches, gateway computers and/or edge servers.

External components 900 can include a computer display monitor 920, a keyboard 930, and a computer mouse 934. External components 900 can also include touch screens, virtual keyboards, touch pads, pointing devices, and other human interface devices. Internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Aspects of the present invention have been described with respect to block diagrams and/or flowchart illustrations of methods, apparatus (system), and computer program products according to embodiments of the invention. It will be understood that each block of the flowchart illustrations and/or block diagrams, and combinations of blocks in the flowchart illustrations and/or block diagrams, can be implemented by computer instructions. These computer instructions may be provided to a processor of a general purpose computer, special purpose computer, or other programmable data processing apparatus to produce a machine, such that instructions, which execute via the processor of the computer or other programmable data processing apparatus, create means for implementing the functions/acts specified in the flowchart and/or block diagram block or blocks.

The aforementioned programs can be written in any combination of one or more programming languages, including low-level, high-level, object-oriented or non object-oriented languages, such as Java®, Cincom Smalltalk™, C, and C++. The program code may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet service provider). Alternatively, the functions of the aforementioned programs can be implemented in whole or in part by computer circuits and other hardware (not shown).

Based on the foregoing, computer system, method and program product have been disclosed in accordance with the present invention. However, numerous modifications and substitutions can be made without deviating from the scope of the present invention. Therefore, the present invention has been disclosed by way of example and not limitation.

What is claimed is:

1. A method to determine if a computer program in a memory of a computer is malicious, the computer program including a plurality of different types of computer program instructions, the method comprising the steps of:
   receiving, by the computer, a request to execute the computer program;
   loading for execution the computer program into the memory of the computer;
   prior to execution of the computer program in the computer, the computer counting the computer program instructions of each of the different types in the computer program loaded into the memory;
   at a time during execution of the computer program in the computer, the computer counting the computer program instructions of each of the different types in the computer program loaded into the memory;
   determining, by the computer, whether the count of the computer program instructions of one of the types determined prior to execution of the computer program differs by at least an associated threshold value from the count of the computer program instructions of the one type determined at the time during execution of the computer program; and
   based on the computer determining that the count of the computer program instructions of one of the types determined prior to execution of the computer program differs by at least an associated threshold value from the count of the computer program instructions of the one type determined at the time during execution of the computer program, the computer making a record that the computer program has an indicia of maliciousness and terminating execution of the program.

2. A method in accordance with claim 1, further comprising the steps of:
   the computer determining that the counts of the computer program instructions of two or more of the types determined prior to execution of the computer program differ by at least associated threshold values from the counts of the computer program instructions determined at the time during execution of the computer program, and wherein the step of making the record that the computer program has an indicia of maliciousness is based on the differences of the counts of the two or more types.

3. A method in accordance with claim 1, wherein the step of the computer counting the program instructions of each of the different types at a time during execution of the computer program is performed at two or more times during execution of the computer program.

4. A method in accordance with claim 1, wherein the step of the computer counting the program instructions of each of the different types at a time during the execution of the computer program is performed by a program routine that is called upon the execution of a computer program instruction of the type operating system interrupt generating program instruction.

5. A method in accordance with claim 4, further comprising the step of inserting a program instruction into the computer program, the inserted program instruction of the type operating system interrupt generating program instruction.

6. A method in accordance with claim 1 wherein the associated threshold value is zero.

7. A method in accordance with claim 1 wherein the associated threshold value is an integer greater than zero.

8. A computer program product to determine if a computer program in a memory of a computer is malicious, the computer program including a plurality of different types of computer program instructions, the computer program product comprising:
one or more computer-readable storage devices and program code stored on the one or more storage devices, the program code comprising:
program code to receive a request to execute the computer program;
program code to load for execution the computer program into the memory of the computer;
program code to count the computer program instruction of each of the different types in the computer program loaded into the memory prior to execution of the computer program in the computer;
program code to count the computer program instructions of each of the different types in the computer program loaded into the memory at a time during execution of the computer program in the computer; and
program code to determine whether the count of the computer program instructions of one of the types determined prior to execution of the computer program differs by at least an associated threshold value from the count of the computer program instructions of the one type determined at the time during execution of the computer program, and in response to determining that the count of the computer program instructions of one of the types determined prior to execution of the computer program differs by at least the associated threshold value from the count of the computer program instructions of the one type determined at the time during execution of the computer program, making a record that the computer program has an indicia of maliciousness and terminating execution of the program.

9. A computer program product in accordance with claim 8, wherein the program code to make a record further comprises:
program code to determine that the counts of the computer program instructions of two or more of the types determined prior to execution of the computer program differ by at least associated threshold values from the counts of the computer program instructions determined at the time during execution of the computer program, and wherein the step of making the record that the computer program has an indicia of maliciousness is based on the differences of the counts of the two or more types.

10. A computer program product in accordance with claim 8, wherein the program code to count the computer program instruction of each of the different types at a time during execution of the computer program are performed at two or more times during execution of the computer program instructions.

11. A computer program product in accordance with claim 8, wherein the program code to count the computer program instruction of each of the different types at a time during execution are performed by program code that is called upon the execution of a computer program instruction of the type operating system interrupt generating program instruction.

12. A computer program product in accordance with claim 11, further comprising program code to cause the computer to insert a program instruction into the computer program, the inserted program instruction of the type operating system interrupt generating program instruction.

13. A computer program product in accordance with claim 8 wherein the associated threshold value is zero.

14. A computer program product in accordance with claim 8 wherein the associated threshold value is an integer greater than zero.

15. A computer system to determine if a computer program in a memory of a computer is malicious, the computer system comprising:
one or more processors, one or more computer-readable memories, one or more computer-readable storage devices, and program instructions stored on the one or more storage devices for execution by the one or more processors via the one or more memories, the program instructions comprising:
program code to receive a request to execute the computer program, the computer program including a plurality of different types of computer program instructions;
program code to load for execution the computer program into the memory of the computer;
program code to count the computer program instruction of each of the different types in the computer program loaded into the memory prior to execution of the computer program in the computer;
program code to count the computer program instructions of each of the different types in the computer program loaded into the memory at a time during execution of the computer program in the computer; and
program code to determine whether the count of the computer program instructions of one of the types determined prior to execution of the computer program differs by at least an associated threshold value from the count of the computer program instructions of the one type determined at the time during execution of the computer program, and in response to determining that the count of the computer program instructions of one of the types determined prior to execution of the computer program differs by at least the associated threshold value from the count of the computer program instructions of the one type determined at the time during execution of the computer program, making a record that the computer program has an indicia of maliciousness and terminating execution of the program.

16. A computer system in accordance with claim 15, further comprising:
program code to determine that the counts of the computer program instructions of two or more of the types determined prior to execution of the computer program differ by at least associated threshold values from the counts of the computer program instructions determined at the time during execution of the computer program, and wherein the step of making the record that the computer program has an indicia of maliciousness is based on the differences of the counts of the two or more types.

* * * * *